United States Patent
Lum et al.

(10) Patent No.: US 9,953,455 B2
(45) Date of Patent: Apr. 24, 2018

(54) HANDLING POST-Z COVERAGE DATA IN RASTER OPERATIONS

(71) Applicant: NVIDIA CORPORATION, Santa Clara, CA (US)

(72) Inventors: Eric B. Lum, San Jose, CA (US); Rui Bastos, Porto Alegre (BR); Jerome F. Duluk, Jr., Palo Alto, CA (US); Henry Packard Moreton, Woodside, CA (US); Yury Y. Uralsky, Santa Clara, CA (US)

(73) Assignee: NVIDIA Corporation, Santa Clara, CA (US)

(*) Notice: Subject to any disclaimer, the term of this patent is extended or adjusted under 35 U.S.C. 154(b) by 44 days.

(21) Appl. No.: 13/802,182

(22) Filed: Mar. 13, 2013

(65) Prior Publication Data
US 2014/0267224 A1  Sep. 18, 2014

(51) Int. Cl.
*G06T 15/00*  (2011.01)
*G06T 15/40*  (2011.01)

(52) U.S. Cl.
CPC .......... *G06T 15/00* (2013.01); *G06T 15/005* (2013.01); *G06T 15/405* (2013.01)

(58) Field of Classification Search
None
See application file for complete search history.

(56) References Cited

U.S. PATENT DOCUMENTS

| | | | |
|---|---|---|---|
| 5,852,443 A | 12/1998 | Kenworthy | |
| 5,943,060 A | 8/1999 | Cosman et al. | |
| 6,204,859 B1* | 3/2001 | Jouppi et al. | 345/592 |
| 7,880,747 B1* | 2/2011 | Molnar | G06T 15/005 345/506 |
| 8,228,328 B1* | 7/2012 | French | G06T 15/40 345/421 |
| 2002/0097241 A1* | 7/2002 | McCormack | G06T 11/40 345/423 |
| 2003/0117409 A1 | 6/2003 | Lefebvre et al. | |
| 2004/0183816 A1* | 9/2004 | Leather et al. | 345/622 |

(Continued)

FOREIGN PATENT DOCUMENTS

TW  200803528 A  1/2008

OTHER PUBLICATIONS

David Blythe, "The Direct3D 10 System," ACM, 2006.*

(Continued)

*Primary Examiner* — Nicholas R Wilson
(74) *Attorney, Agent, or Firm* — Artegis Law Group, LLP

(57) ABSTRACT

Techniques are disclosed for storing post-z coverage data in a render target. A color raster operations (CROP) unit receives a coverage mask associated with a portion of a graphics primitive, where the graphics primitive intersects a pixel that includes a multiple samples, and the portion covers at least one sample. The CROP unit stores the coverage mask in a data field in the render target at a location associated with the pixel. One advantage of the disclosed techniques is that the GPU computes color and other pixel information only for visible fragments as determined by post-z coverage data. The GPU does not compute color and other pixel information for obscured fragments, thereby reducing overall power consumption and improving overall render performance.

30 Claims, 12 Drawing Sheets

(56) References Cited

U.S. PATENT DOCUMENTS

| | | | |
|---|---|---|---|
| 2010/0026682 A1* | 2/2010 | Plowman et al. | 345/419 |
| 2011/0080407 A1* | 4/2011 | Duluk, Jr. | G06T 15/005 |
| | | | 345/426 |
| 2011/0243469 A1* | 10/2011 | McAllister | G06T 9/00 |
| | | | 382/239 |
| 2012/0013624 A1* | 1/2012 | Fowler | 345/520 |
| 2012/0050303 A1* | 3/2012 | McAllister | G09G 5/02 |
| | | | 345/589 |
| 2012/0086715 A1* | 4/2012 | Patel et al. | 345/441 |

OTHER PUBLICATIONS

Ned Greene, "Hierarchical Polygon Tiling with Coverage Masks," Apple Computer, ACM, 1996.*
Loren Carpenter "The A-buffer, an Antialiased Hidden Surface Method," ACM, 1984.*
Daniel Rice. "OpenVG Specification" The Khronos Group Inc., Version 1.0.1, Jan. 26, 2007.*
Tom Gillen, "GBuffer Layout," http://tomgillen.blogspot.com/2010/07/gbuffer-layout.html, Jul. 23, 2010.*
Owens et al., "Distributed Texture Memory in a Multi-GPU Environment," Computer Graphics forum, 2008.*

\* cited by examiner

HANDLING POST-Z COVERAGE DATA IN RASTER OPERATIONS

BACKGROUND OF THE INVENTION

Field of the Invention

The present invention generally relates to three-dimensional (3D) graphics processing and, more particularly, to handling post-z coverage data in raster operations.

Description of the Related Art

Computer generated images that include 2D and 3D graphics objects are typically rendered using a graphics processing unit (GPU) with one or more multistage graphics processing pipelines. Such graphics pipelines include various programmable and fixed function stages. Programmable stages include various processing units that execute shader programs to render graphics objects and to generate various visual effects associated with graphics objects. Fixed function stages perform additional graphics operations not performed by the programmable stages. One such fixed-function unit is a raster operations unit that performs operations such as stencil, z test, blending, and the like, and outputs pixel data as processed graphics data for storage in graphics memory. The GPU renders graphics objects into one or more render targets. Each render target includes multiple picture elements (pixels), and each pixel may, in turn, include multiple samples. Once rendering completes, the pixels in one or more render targets may be transmitted to a display device for visual display of the rendered image.

During rendering, the GPU determines coverage information for each graphics primitive, where a graphics primitive includes points, lines, and triangles in 3D space. The graphics primitives are subdivided into fragments, where each fragment corresponds to one or more samples of a particular pixel in a render target. Once the GPU determines coverage information for the fragments, the GPU may then compute color or other pixel information for the covered samples each fragment. One drawback with this approach is the GPU may waste computational effort computing color and other pixel information for fragments that are not visible in the final rendered image. Fragments associated with a particular graphics primitive may be covered by fragments associated with a different graphics primitive that is nearer to the screen surface of the display device. Computing color and other pixel information for obscured fragments reduces the time available for rendering graphics objects that are visible in the final image, thus decreasing overall GPU performance.

One possible solution to this problem is to compute color and other pixel information for fragments that pass a depth test, where the depth test determines which fragments are visible and which fragments are not visible based on distance from the screen surface. However, in some cases, such a depth test may be performed at a late stage in the graphics processing pipeline. As a result, the depth test results are unknown at the time the color and other pixel information are computed. In other cases, the unit that typically performs such depth testing may be in a low-power state to increase battery life. Therefore, the results of the depth testing may be unavailable at the time the GPU renders the fragments.

As the foregoing illustrates, what is needed in the art is a technique for rendering fragment data in a graphics processing pipeline that reduces the amount of processing performed for obscured fragments.

SUMMARY OF THE INVENTION

One embodiment of the present invention sets forth a method for storing post-z coverage data in a render target. The method includes receiving a coverage mask associated with a portion of a graphics primitive, where the graphics primitive intersects a pixel that includes a multiple samples, and the portion covers at least one sample. The method further includes storing the coverage mask in a data field in the render target at a location associated with the pixel.

Other embodiments include, without limitation, a computer-readable medium that includes instructions that enable a processing unit to implement one or more aspects of the disclosed methods. Other embodiments include, without limitation, a subsystem that includes a processing unit configured to implement one or more aspects of the disclosed methods as well as a system configured to implement one or more aspects of the disclosed methods.

One advantage of the disclosed techniques is that the GPU computes color and other pixel information only for visible fragments as determined by post-z coverage data. The GPU does not compute color and other pixel information for obscured fragments, thereby reducing overall power consumption and improving overall render performance.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
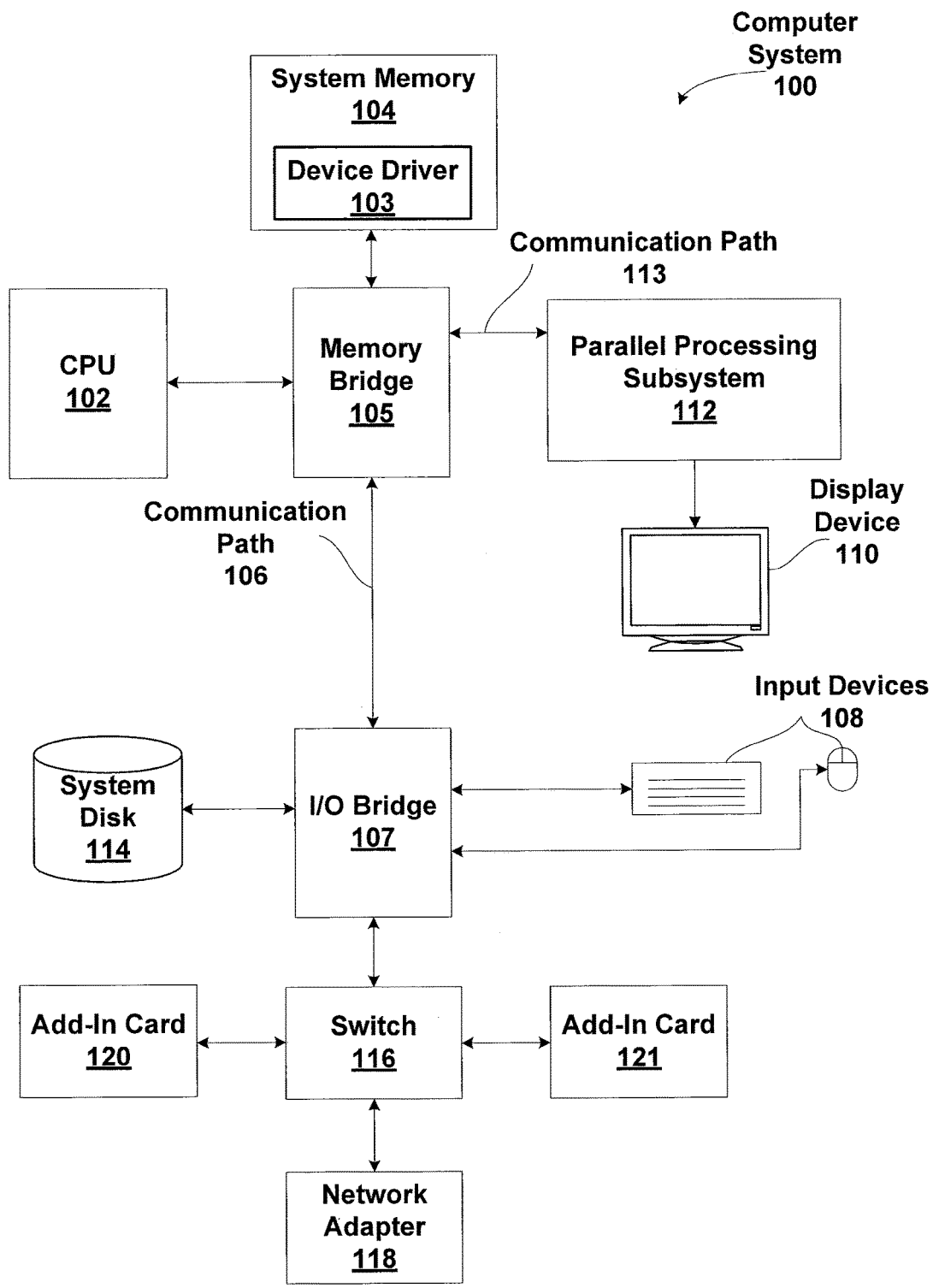
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
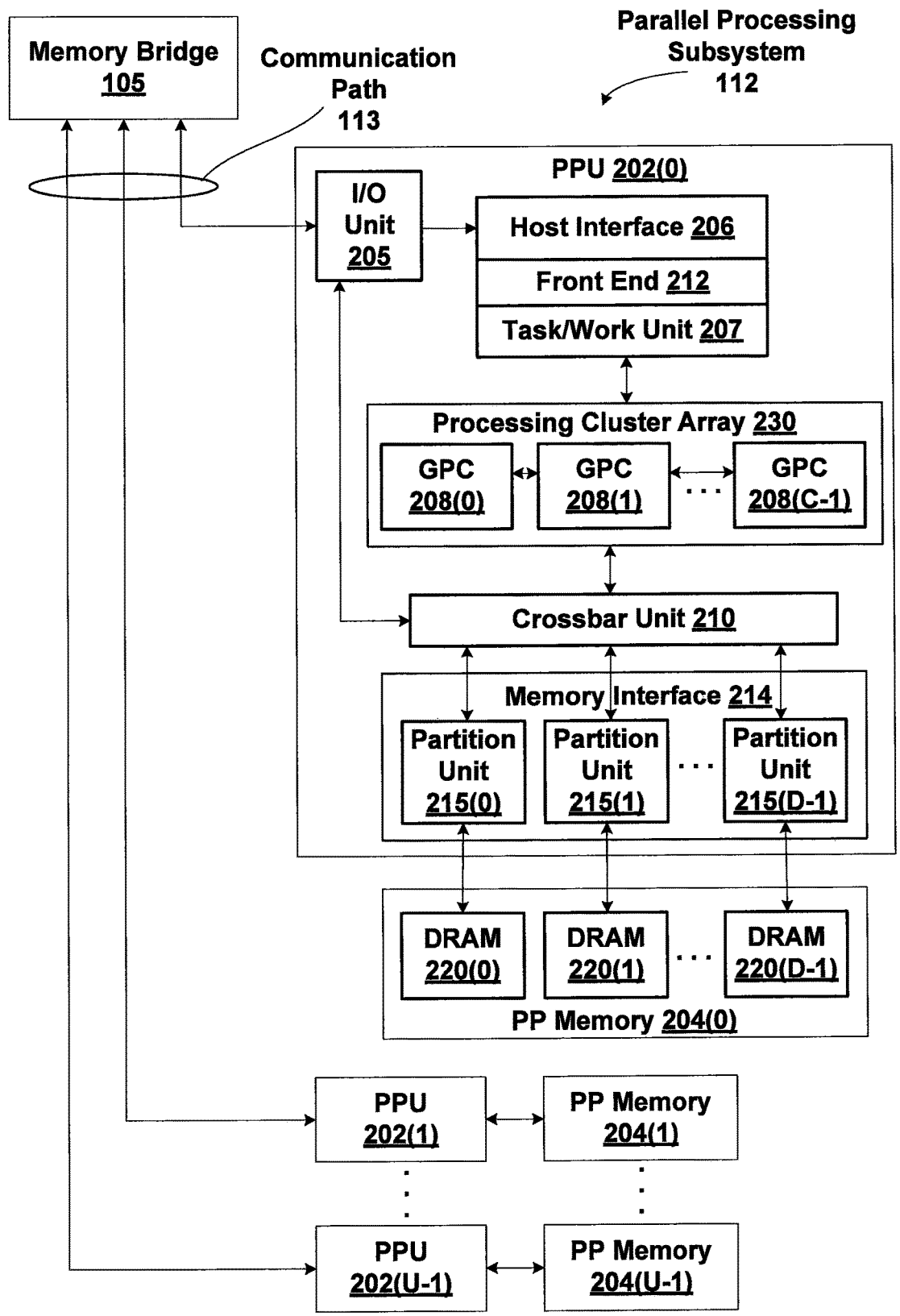
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where $D \geq 1$. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Figure 3A:
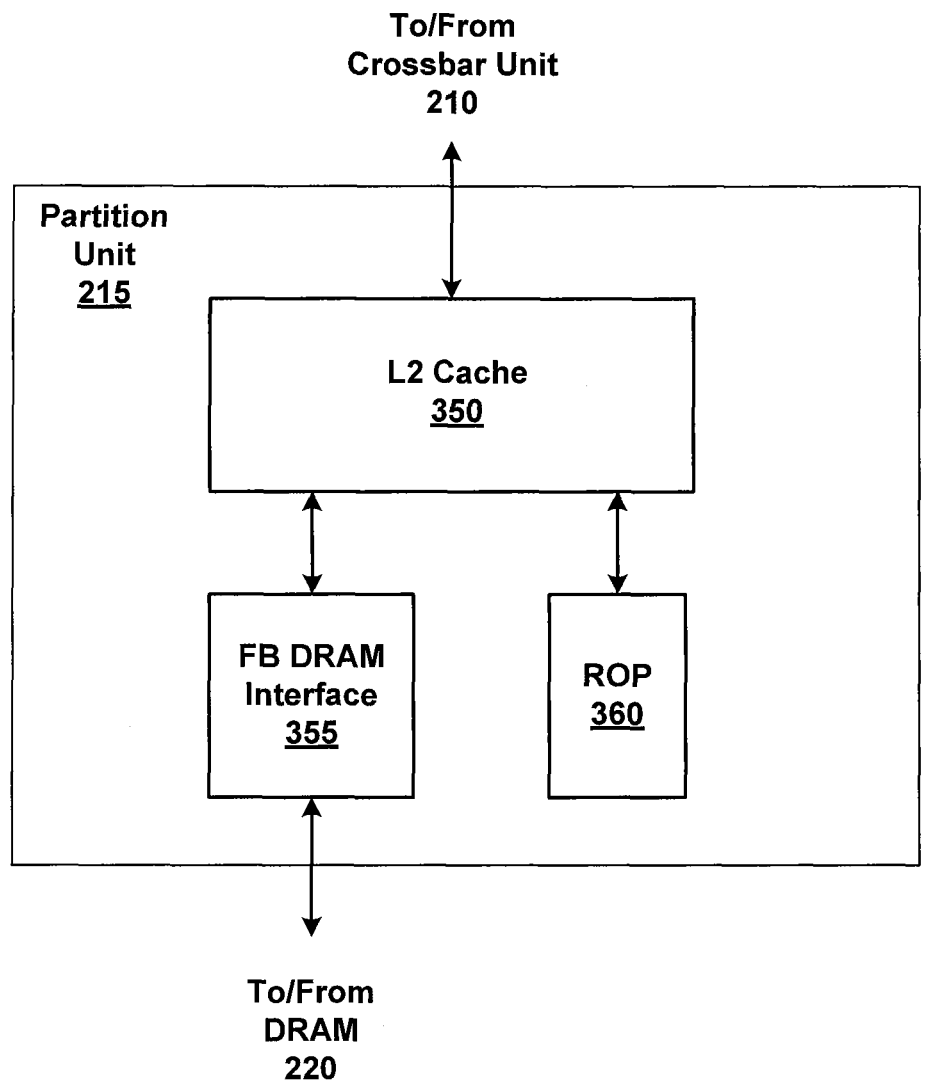
FIG. 3A is a block diagram of a partition unit within one of the PPUs of FIG. 2, according to one embodiment of the present invention.

FIG. 3A is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Figure 3B:
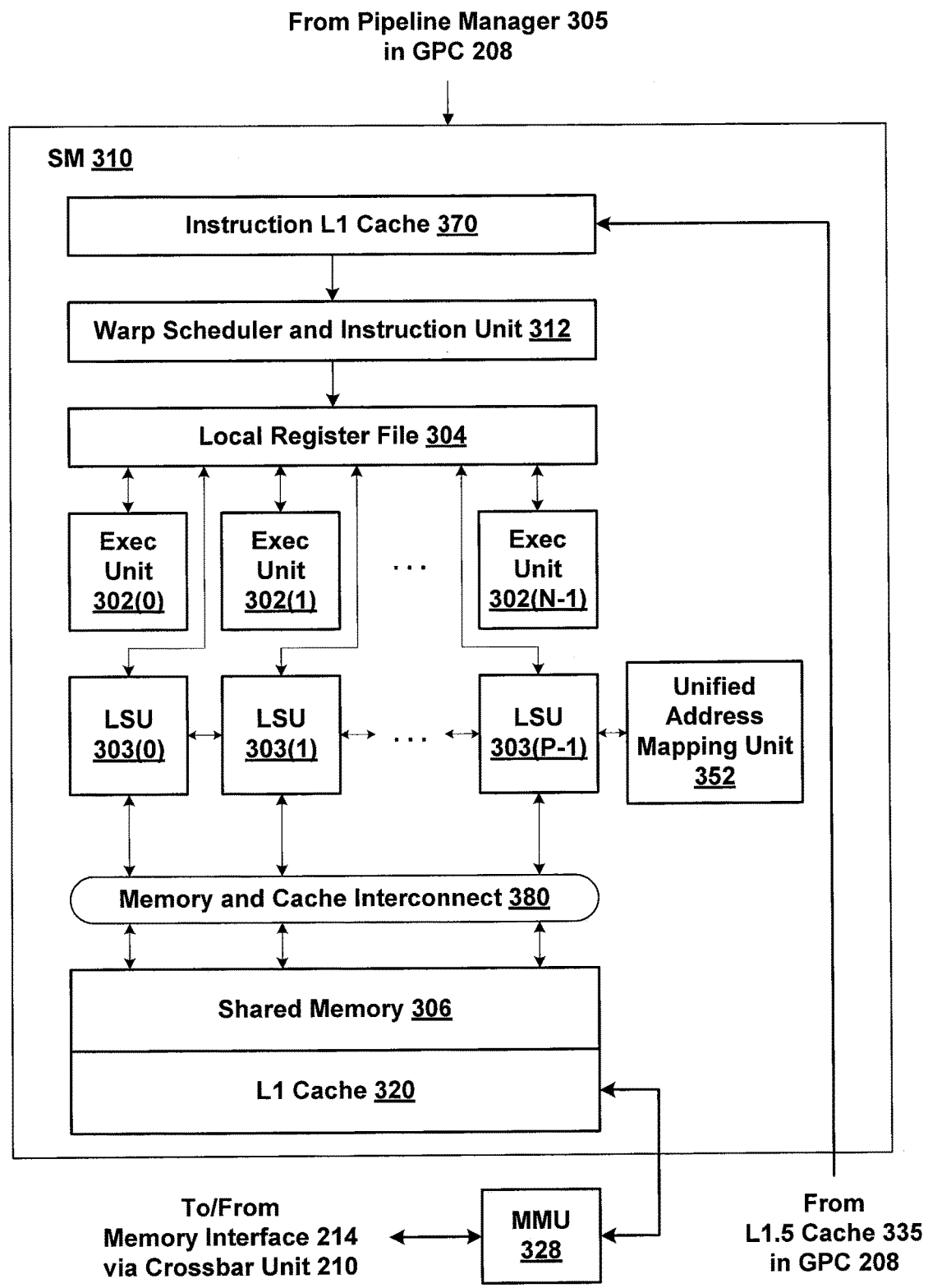
FIG. 3B is a block diagram of a portion of a streaming multiprocessor (SM) within a general processing cluster (GPC) of FIG. 2, according to one embodiment of the present invention.

FIG. 3B is a block diagram of a portion of a streaming multiprocessor (SM) 310 within a general processing cluster (GPC) 208 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager (not shown) that distributes processing tasks to one or more streaming multiprocessors (SMs) 310, where each SM 310 configured to process one or more thread groups. Each SM 310 includes an instruction L1 cache 370 that is configured to receive instructions and constants from memory via an L1.5 cache (not shown) within the GPC 208. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303. The SM functional units may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that a system that, in a GPC 208 that includes $\underline{M}$ streaming multiprocessors 310, up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads that execute the same processing task represented by task metadata (TMD) (not shown) (or by all LSUs 303) that store a CTA identifier, the CTA dimensions, the dimensions of a grid to which the CTA belongs (or queue position if the TMD encodes a queue task instead of a grid task), and an identifier of the TMD to which the CTA is assigned.

If the TMD is a grid TMD, execution of the TMD causes a fixed number of CTAs to be launched and executed to process the fixed amount of data stored in the queue 525. The number of CTAs is specified as the product of the grid width, height, and depth. The fixed amount of data may be stored in the TMD or the TMD may store a pointer to the data that will be processed by the CTAs. The TMD also stores a starting address of the program that is executed by the CTAs.

If the TMD is a queue TMD, then a queue feature of the TMD is used, meaning that the amount of data to be processed is not necessarily fixed. Queue entries store data for processing by the CTAs assigned to the TMD. The queue entries may also represent a child task that is generated by another TMD during execution of a thread, thereby providing nested parallelism. Typically, execution of the thread, or CTA that includes the thread, is suspended until execution of the child task completes. The queue may be stored in the TMD or separately from the TMD, in which case the TMD stores a queue pointer to the queue. Advantageously, data generated by the child task may be written to the queue while the TMD representing the child task is executing. The queue may be implemented as a circular queue so that the total amount of data is not limited to the size of the queue.

CTAS that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 375 stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

It will be appreciated that the core architecture described herein is illustrative and that variations and modifications are possible. Any number of processing units, e.g., SMs 310, may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Persons of ordinary skill in the art will understand that the architecture described in FIGS. 1-3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Graphics Pipeline Architecture

Figure 4:
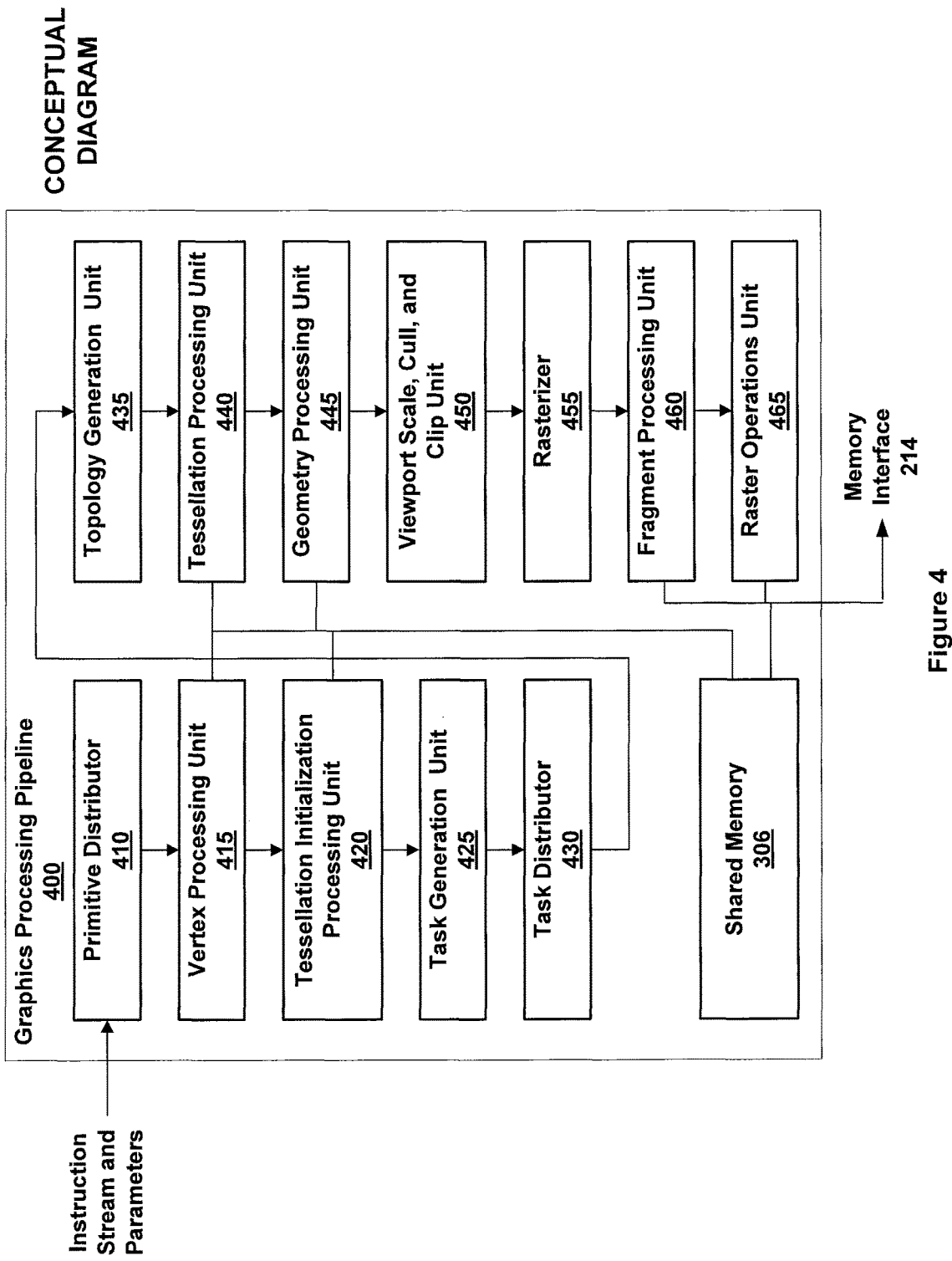
FIG. 4 is a conceptual diagram of a graphics processing pipeline that one or more of the parallel processing units of FIG. 2 can be configured to implement, according to one embodiment of the present invention.

FIG. 4 is a conceptual diagram of a graphics processing pipeline 400 that one or more of the PPUs 202 of FIG. 2 can be configured to implement, according to one embodiment of the present invention. For example, one of the SMs 310 may be configured to perform the functions of one or more of a vertex processing unit 415, a tessellation initialization processing unit 420, a tessellation processing unit 440, a geometry processing unit 445, and a fragment processing unit 460. The functions of primitive distributor 410, task generation unit 425, task distributor 430, topology generation unit 435, viewport scale, cull, and clip unit 450, rasterizer 455, and raster operations unit 465 may also be performed by other processing engines within a GPC 208 and a corresponding partition unit 215. Alternately, graphics processing pipeline 400 may be implemented using dedicated processing units for one or more functions.

The graphics processing pipeline also includes a shared memory 306 that is local to the graphics processing pipelines 400 within an SM 310. As further described below, inter-stage buffers (not shown) within the shared memory 306 are allocated and deallocated by the various processing units in the graphics processing pipeline 400 as needed. A processing unit reads input data from one or more inter-stage buffers, processes the input data to produce output data, and stores the resulting output data in one or more inter-stage buffers. A subsequent processing unit may read this resulting output data as input data for the subsequent processing unit. The subsequent processing unit processes the data and stores output data in one or more inter-stage buffers, and so on. The shared memory 306 and various other stages of the graphics processing pipeline connect with external memory via the memory interface 214.

The primitive distributor 410 processing unit collects vertex data for high-order surfaces, primitives, and the like, and outputs the vertex data, including the vertex attributes, to vertex processing unit 415. In some embodiments, the primitive distributor 410 includes a vertex attribute fetch unit (not shown) that retrieves the vertex attributes and stores the vertex attributes in the shared memory 306. The vertex processing unit 415 is a programmable execution unit that is configured to execute vertex shader programs, lighting and transforming vertex data as specified by the vertex shader programs. For example, the vertex processing unit 415 may be programmed to transform the vertex data from an object-based coordinate representation (object space) to an alternatively based coordinate system such as world space or normalized device coordinates (NDC) space. The vertex processing unit 415 may read data that is stored in shared memory 306, L1 cache 320, parallel processing memory 204, or system memory 104 by primitive distributor 410 for use in processing the vertex data. The vertex processing unit 415 stores processed vertices in the inter-stage buffers within the shared memory 306.

The tessellation initialization processing unit 420 is a programmable execution unit that is configured to execute tessellation initialization shader programs. The tessellation initialization processing unit 420 processes vertices produced by the vertex processing unit 415 and generates graphics primitives known as patches. The tessellation initialization processing unit 420 also generates various patch attributes. The tessellation initialization processing unit 420 then stores the patch data and patch attributes in the inter-stage buffers within the shared memory 306. In some embodiments, the tessellation initialization shader program may be called a hull shader or a tessellation control shader.

The task generation unit 425 retrieves data and attributes for vertices and patches from the inter-stage buffers of the shared memory 306. The task generation unit 425 generates tasks for processing the vertices and patches for processing by later stages in the graphics processing pipeline 400.

The task distributor 430 redistributes the tasks produced by the task generation unit 425. The tasks produced by the various instances of the vertex shader program and the tessellation initialization program may vary significantly between one graphics processing pipeline 400 and another. The task distributor 430 redistributes these tasks such that each graphics processing pipeline 400 has approximately the same workload during later pipeline stages.

The topology generation unit 435 retrieves tasks distributed by the task distributor 430. The topology generation unit 435 indexes the vertices, including vertices associated with patches, and computes texture coordinates corresponding to the vertices. The topology generation unit 435 then stores the indexed vertices in the inter-stage buffers within the shared memory 306.

The tessellation processing unit 440 is a programmable execution unit that is configured to execute tessellation shader programs. The tessellation processing unit 440 reads input data from and writes output data to the inter-stage buffers of the shared memory 306. This output data in the inter-stage buffers is passed to the next shader stage, the geometry processing unit 445 as input data. In some embodiments, the tessellation shader program may be called a domain shader or a tessellation evaluation shader.

The geometry processing unit 445 is a programmable execution unit that is configured to execute geometry shader programs, thereby transforming graphics primitives. Vertices are grouped to construct graphics primitives for processing, where graphics primitives include triangles, line segments, points, and the like. For example, the geometry processing unit 445 may be programmed to subdivide the graphics primitives into one or more new graphics primitives and calculate parameters, such as plane equation coefficients, that are used to rasterize the new graphics primitives.

In some embodiments, the geometry processing unit 445 may also add or delete elements in the geometry stream. The geometry processing unit 445 outputs the parameters and vertices specifying new graphics primitives to a viewport scale, cull, and clip unit 450. The geometry processing unit 445 may read data that is stored in shared memory 306, parallel processing memory 204 or system memory 104 for use in processing the geometry data. The viewport scale, cull, and clip unit 450 performs clipping, culling, and viewport scaling and outputs processed graphics primitives to a rasterizer 455.

The rasterizer 455 scan converts the new graphics primitives and outputs fragments and coverage data to fragment processing unit 460. Additionally, the rasterizer 455 may be configured to perform z culling and other z-based optimizations.

The fragment processing unit 460 is a programmable execution unit that is configured to execute fragment shader programs, transforming fragments received from the rasterizer 455, as specified by the fragment shader programs. For example, the fragment processing unit 460 may be programmed to perform operations such as perspective correction, texture mapping, shading, blending, and the like, to produce shaded fragments that are output to raster operations unit 465. The fragment processing unit 460 may read data that is stored in shared memory 306, parallel processing memory 204 or system memory 104 for use in processing the fragment data. Fragments may be shaded at pixel, sample, or other granularity, depending on the programmed sampling rate.

The raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory. In various embodiments, the ROP 465 may be located in the memory interface 214, in the GPCs 208, in the processing cluster array 230 outside of the GPCs, or in a separate unit (not shown) within the PPUs 202.

Handling Post-Z Coverage Data in Raster Operations

Performing z testing at certain stages of the graphics processing pipeline 400 allows the graphics processing pipeline 400 to discard certain fragments early so that further processing cycles are not wasted on fragments that are not visible in the final rendered image. Typically, the results of such z testing are not directly stored in the render targets. However, as further described below, some applications benefit from storing z testing results in a render target for subsequent processing operations.

Figure 5:
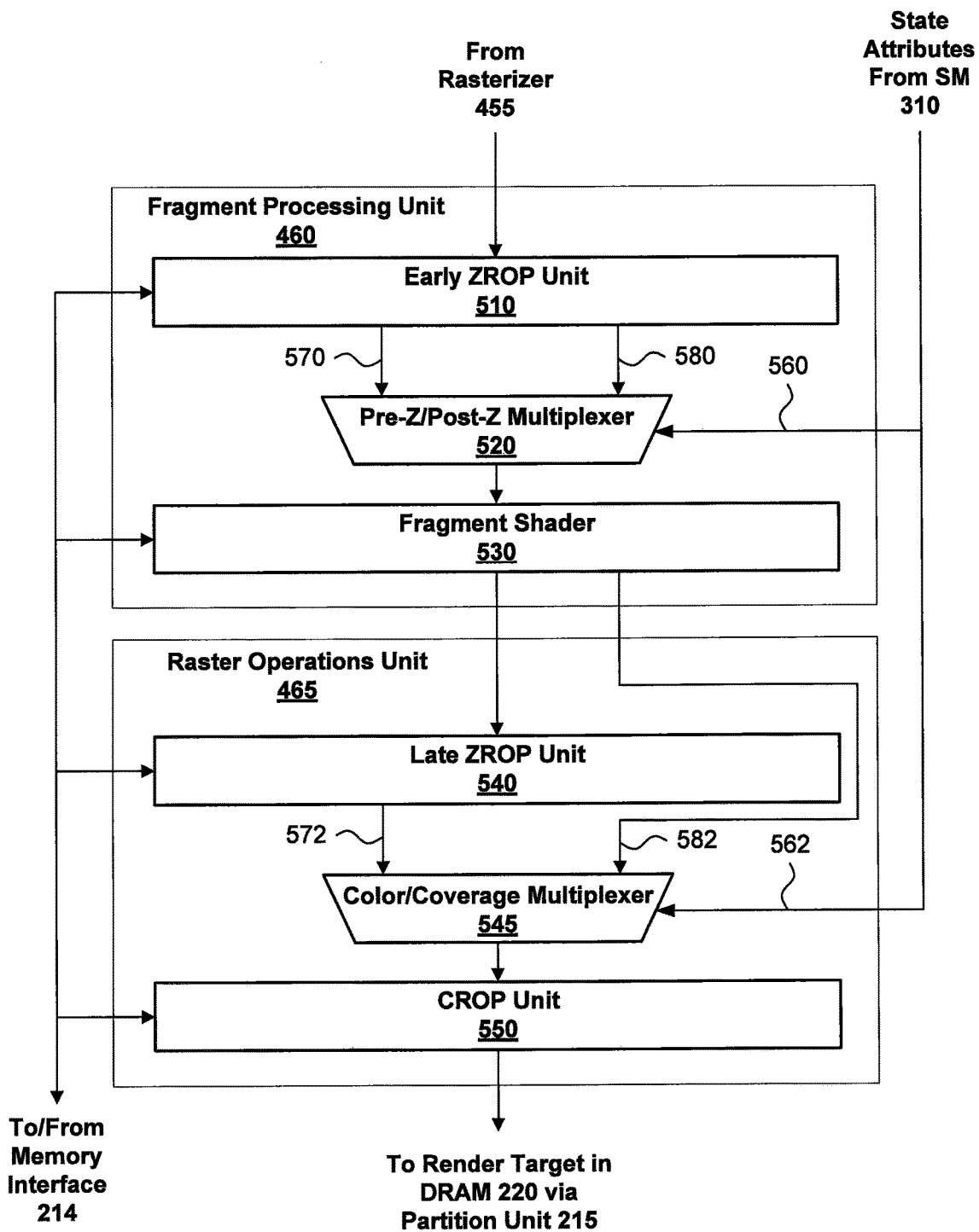
FIG. 5 illustrates the fragment processing unit and raster operations unit of FIG. 4, according to one embodiment of the present invention.

FIG. 5 illustrates the fragment processing unit 460 and raster operations unit 465 of FIG. 4, according to one embodiment of the present invention. As shown, the fragment processing unit 460 includes an early z-raster operations (ZROP) unit 510, a pre-z/post-z multiplexer 520, and a fragment shader 530. As further shown, the raster operations unit 465 includes a late ZROP unit 540, a color/coverage multiplexer 545, and a color raster operations (CROP) unit 550.

The early ZROP unit 510 receives fragment data from the rasterizer 455, where the fragment data may include, without limitation, z-plane equation data, plane equation data for color components and texture coordinates, a screen space position (x,y), and rasterized coverage mask. The early ZROP unit 510 computes z information for each sample position using sample positions specified by the multisample mode and plane equation data provided by rasterizer 455. The early ZROP unit 510 compares z values for the current samples to previously stored z values for the corresponding sample positions. Such a process is conventionally known as "z testing" or "hidden surface removal." In some embodiments, the early ZROP unit 510 may write the z values of samples that pass the z test to a render target configured as a depth (or z) buffer. The early ZROP unit 510 discards samples that do not pass the z test, and the early ZROP unit 510 does not write any z values for those discarded samples.

The early ZROP unit 510 also computes coverage information based on which samples of a given pixel are covered by the fragment currently being processed. When the early ZROP unit 510 computes the coverage mask based solely on the fragment currently being processed, such a coverage mask is known as pre-z coverage information 570. When the early ZROP unit 510 computes the coverage mask based both the fragment currently being processed and previously rendered fragment data, such a coverage mask is known as post-z coverage information 580. The early ZROP unit 510 provides the coverage masks for each fragment to the pre-z/post-z multiplexer 520. In some embodiments, the early ZROP unit 510 may also compute stencil values that are used in conjunction with z values when making a determination of whether a particular sample passes or fails z testing.

The pre-z/post-z multiplexer 520 selects whether pre-z coverage information 570 or post-z coverage information 580 passes from the early ZROP unit 510 to the fragment shader 530, based on the state of the control signal 560. The pre-z/post-z multiplexer 520 receives the control signal 560 as a state attribute from a mechanism (not shown) in the SM 310. However, any technically feasible unit in the graphics processing pipeline 400 may provide the control signal 560.

The fragment shader 530 computes and processes color values and other pixel information for one or more sample positions of a pixel using the fragment data received from rasterizer 455 via the pre-z/post-z multiplexer 520. In some embodiments, the fragment shader 530 may also modify z values received from the pre-z/post-z multiplexer 520 for one or more sample positions using the plane equation data provided by the rasterizer 455. Alternatively, the fragment shader 530 may compute new z values without using the plane equation data provided by rasterizer 455. Alternatively, the fragment shader 530 may pass z values received from the pre-z/post-z multiplexer 520 without modification. The fragment shader 530 transmits color information 582 to the color/coverage multiplexer 545.

The late ZROP unit 540 functions essentially the same as the early ZROP unit 510, except that the late ZROP unit performs z testing after the fragment shader 530 completes processing of a fragment. The late ZROP unit 540 is used for z testing when the fragment shader 530 creates new z information for one or more fragments, when the fragment shader 530 modifies existing z information associated with one or more fragments, or when z information that may be computed by the early ZROP unit 510 is otherwise invalidated. The late ZROP unit 540 passes the coverage information 572 to the color/coverage multiplexer 545.

The color/coverage multiplexer 545 selects whether color information 582 from the fragment shader 530 or coverage information 572 from the late ZROP unit 540 passes to the CROP unit 550, based on the state of the control signal 562. The color/coverage multiplexer 545 receives the control signal 562 as a state attribute from a mechanism (not shown)

in the SM 310. However, any technically feasible unit in the graphics processing pipeline 400 may provide the control signal 562.

The CROP unit 550 performs various blending or compositing operations on the pixel information received from the fragment shader 530 and the pixel information stored in one or more render targets. The CROP unit 550 stores the results of such blending or compositing operations in one or more render targets, based on the pre-z or post-z coverage information received from the fragment shader. As further described below, the CROP unit 550 stores post-z coverage information in one or more render targets, in addition to or instead of storing the results of blending or compositing operations. The CROP unit 550 stores information in the render targets via one or more the partition units 215.

Figure 6:
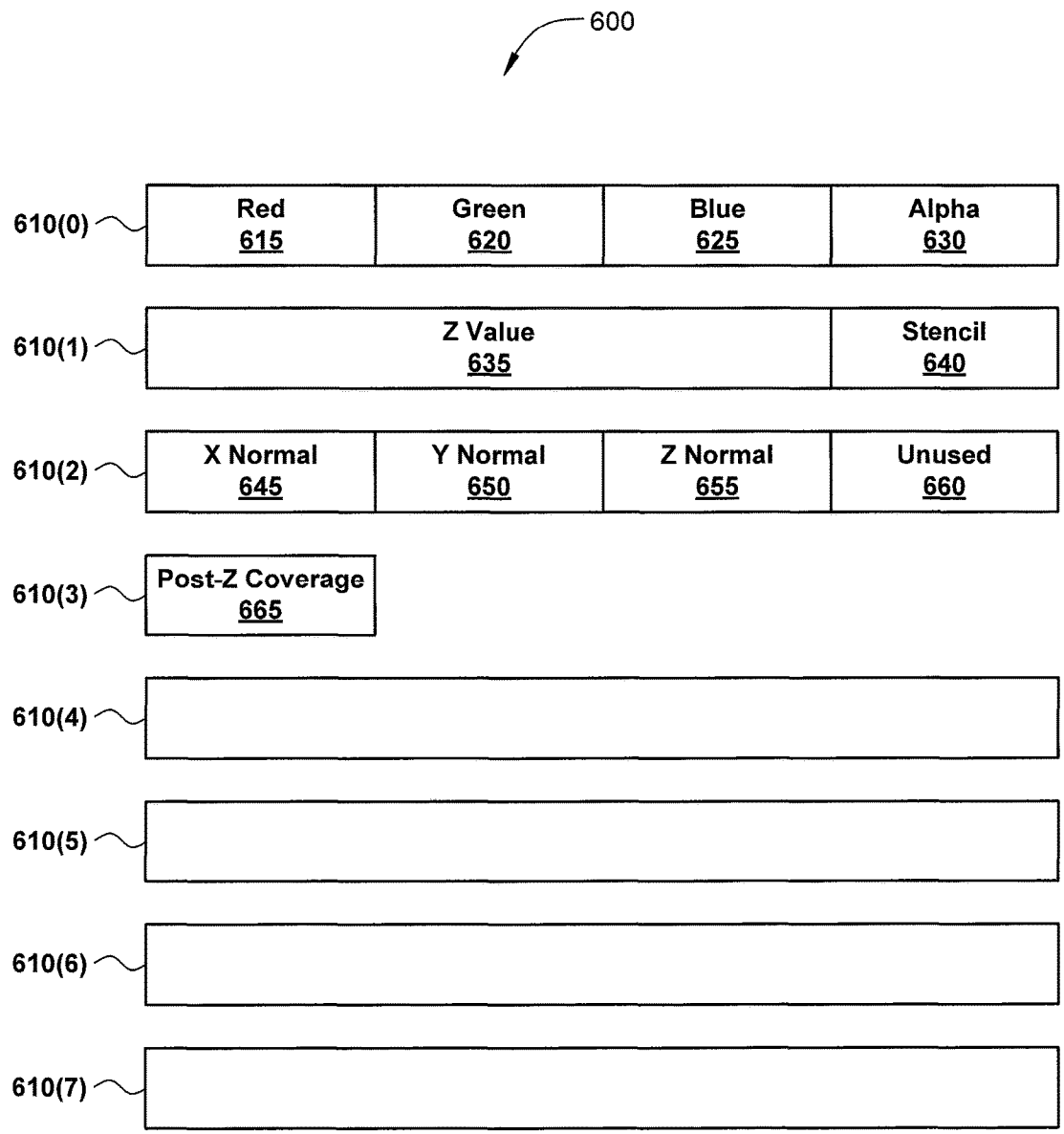
FIG. 6 illustrates a set of render targets as stored in one or more of the partition units of FIG. 2, according to one embodiment of the present invention.

FIG. 6 illustrates a set of render targets 600 as stored via one or more of the partition units 215 of FIG. 2, according to one embodiment of the present invention. As shown, the set of render targets 600 includes eight separate render targets 610(0)-610(7).

The first render target 610(0) includes four fields representing color and transparency information associated with a corresponding sample or fragment. As shown, the four fields include a red value 615, green value 620, blue value 625, and alpha, or transparency, value 630.

The second render target 610(1) includes two fields representing depth and stencil information associated with a corresponding sample or fragment. As shown, the two fields include a z, or depth, value 635 and a stencil mask 640. As shown, the z value 635 includes more bits than the stencil mask 640.

The third render target 610(2) includes four fields representing surface normal vector information associated with a corresponding sample or fragment. As shown, the four fields include an x-axis normal vector 645, a y-axis normal vector 650, and a z-axis normal vector 655. In this particular configuration for the third render target 610(2), the fourth field is unused 660.

The fourth render target 610(3) includes a single field representing post-z coverage information 665 associated with a corresponding sample or fragment. As described herein, the CROP unit 550 stores post-z coverage information in a render target. In one embodiment, the CROP unit may store such post-z coverage information in the post-z coverage information 665 field of the fourth render target 610(3).

The remaining render targets 610(4)-610(7) are configured to store additional information associated with a corresponding sample or fragment. Such configurations (not shown) include storage for various information, including, without limitation, 3D positional data, diffuse lighting information, and specular lighting information.

It will be appreciated that the architecture described herein is illustrative only and that variations and modifications are possible. In one example, the techniques are described herein in the context of eight render targets 610 in a given configuration. However, the described techniques could be employed using any number of render targets 610. Each render target could be configured independently of other render targets to include any number of fields. Each field within a render target could be configured independently of other fields to include any number of bits. In another example, the set of render targets 600 includes a render target 610(3) with a single field for storage of post-z coverage information 665. However, post-z coverage information could be stored in any technically feasible field in any render target 610, so long as the field includes a sufficient quantity of bits to store the post-z coverage information. Specifically, the post-z coverage information could be stored in the fourth unused field 660 of the third render target 610(2). Alternatively, when a specific application does not use a stencil mask, the post-z coverage information could be stored in the stencil mask field 640 of the second render target 610(1).

In another example, the CROP unit 550 could attempt to store post-z coverage information in a field that is considered to be ineligible to store such information. In such cases, the CROP unit 550 could perform any suitable operation, including, without limitation, storing the post-z coverage information in the ineligible field, discarding the store operation so that the data stored in the fields is not overwritten, or performing a store or discard based on a preference indicated by the current application. In yet another example, as described herein, the CROP unit 550 stores post-z coverage information in a render target 610. However, any technically feasible unit within the graphics processing pipeline 400 could store post-z coverage data in a render target 610, including, without limitation, the fragment shader 530, the early ZROP unit 510, and the late ZROP unit 540. In another example, the system described herein includes two separate units for z-raster operations, specifically an early ZROP unit 510 and a late ZROP unit 540. However, the techniques described herein could be used in conjunction that has a single ZROP unit (not shown) that is configurable to perform early z-raster operations or late z-raster operations. Such a shared ZROP unit would be configurable via communication paths, multiplexers, or the like to perform z testing prior to the fragment shader 530 (early z testing) or after the fragment shader 530 (late z testing).

Figure 7A:
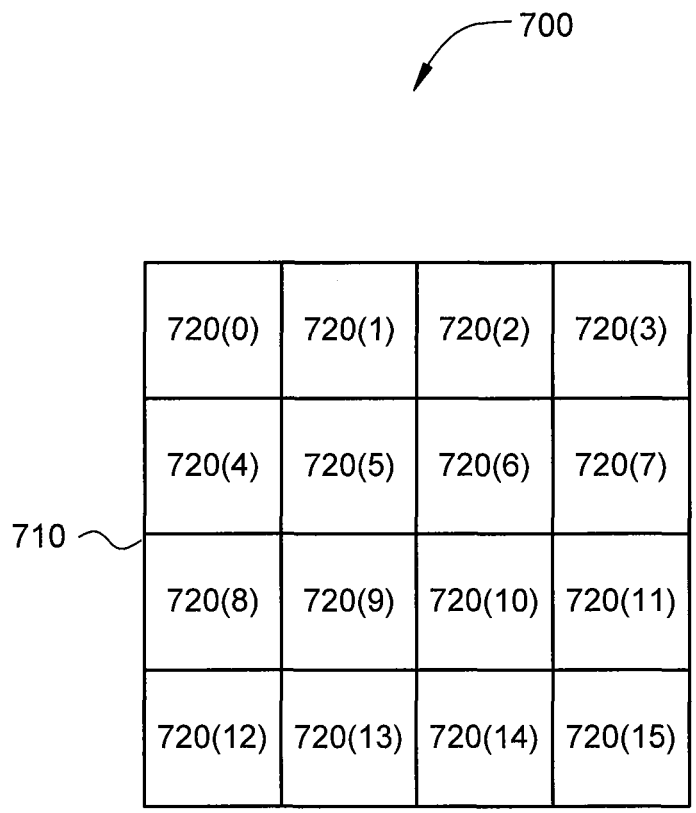
FIGS. 7A-7D illustrate a pixel that intersects multiple graphics primitives, according to one embodiment of the present invention.

FIGS. 7A-7D illustrate a pixel 710 that intersects multiple graphics primitives 730 735 740, according to one embodiment of the present invention. As shown in FIG. 7A, each pixel 710 is subdivided into sixteen samples 720(0)-720(15). As further described herein, post-z coverage data for is computed for each of the graphics primitives 730 735 740 based on the samples 720 covered by the graphics primitives 730 735 740. In one embodiment, post-z coverage data may be represented by a bit mask, where each bit in the map includes post-z coverage data for a given sample 720. Such a bit mask may be sixteen bits wide, to include post-z coverage data for the sixteen samples 720(0)-720(15) of the pixel 710. The most significant of the bit mask may correspond to sample 720(15), while the least significant bit may correspond to sample 720(0). A "one" value in a bit position of the bit mask may indicate that a graphics primitive 730 735 740 covers the corresponding sample 720, while a "zero" value in a bit position of the bit mask may indicate that a graphics primitive 730 735 740 does not cover the corresponding sample 720.

Figure 7B:
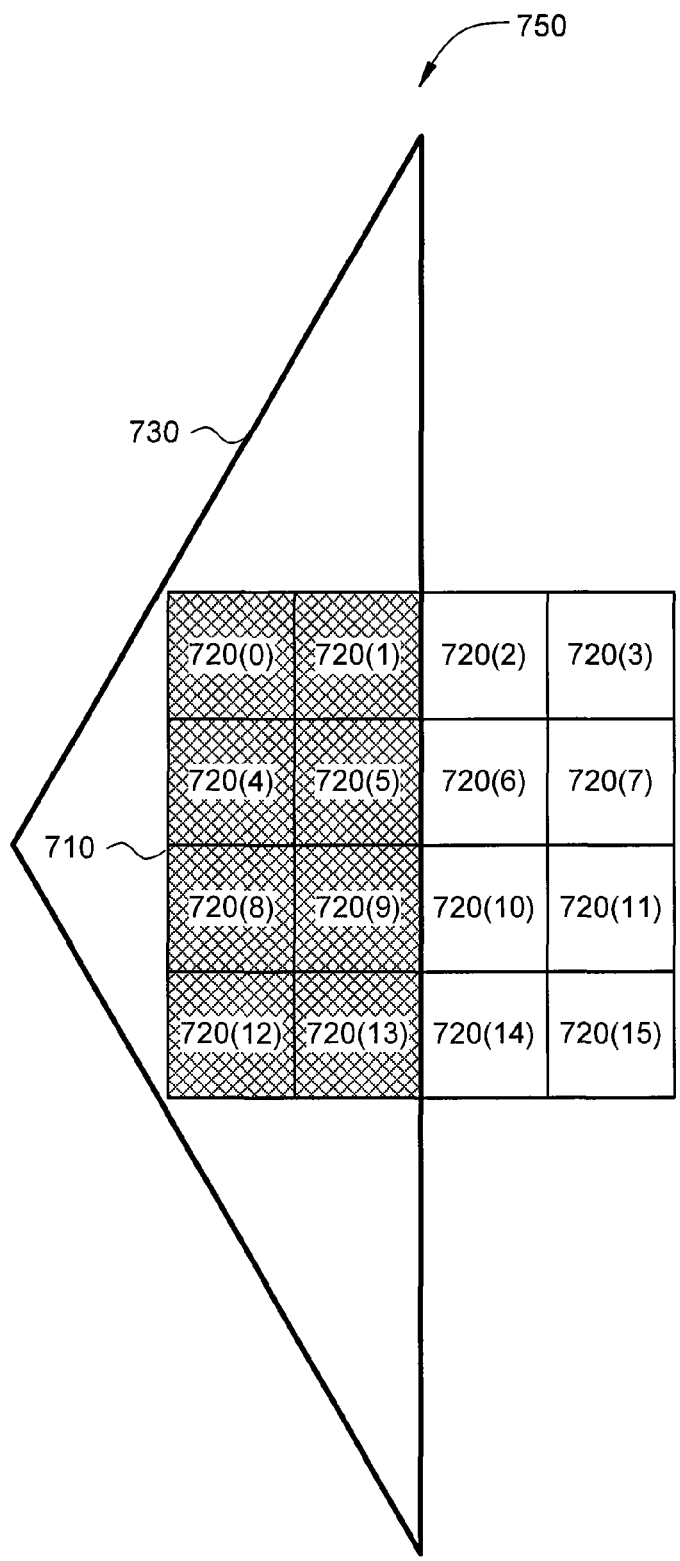

As shown in FIG. 7B, a first graphics primitive 730 intersects with the pixel 710. The graphics primitive 730 covers shaded samples 720(0), 720(1), 720(4), 720(5), 720(8), 720(9), 720(12), and 720(13). The corresponding bit mask may be 0x3333, reflecting the eight samples of pixel 710 that are covered by the graphics primitive 730. The CROP unit 550 stores this post-z coverage bit mask in a render target 610 at the location corresponding to the pixel 710 and associated with the graphics primitive 730. The post-z coverage bit mask may be stored in multiple locations in the render targets, where each location represents a sample 720 that is covered within the same pixel 710.

Figure 7C:
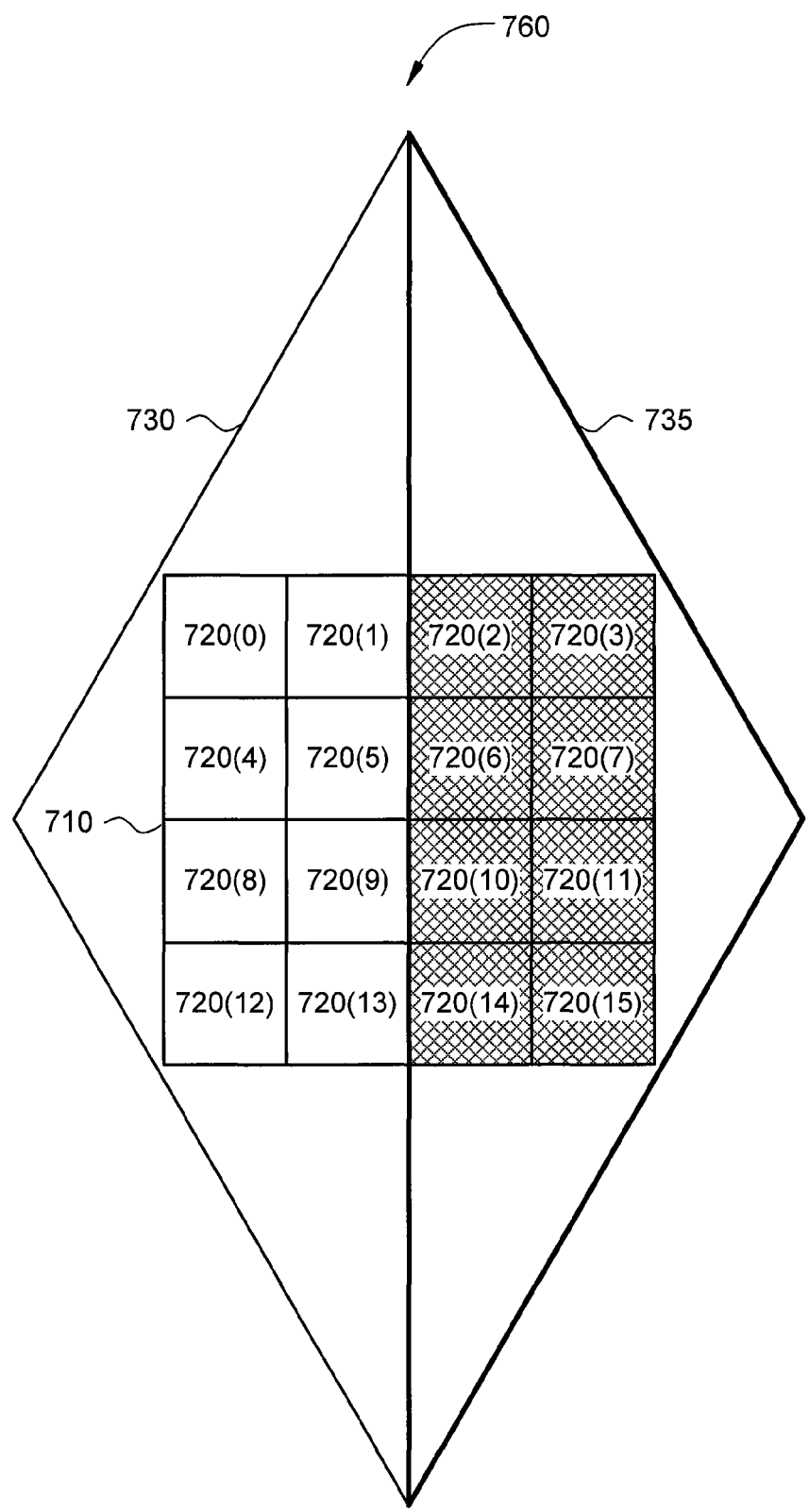

As shown in FIG. 7C, a second graphics primitive 735 intersects with the pixel 710. The graphics primitive 735 covers shaded samples 720(2), 720(3), 720(6), 720(7), 720 (10), 720(11), 720(14), and 720(15). The corresponding bit mask may be 0xCCCC, reflecting the eight samples of pixel 710 that are covered by the graphics primitive 735. The CROP unit 550 stores this post-z coverage bit mask in a render target 610 at the location corresponding to the pixel 710 and associated with the graphics primitive 735. The post-z coverage bit mask may be stored in multiple locations in the render targets, where each location represents a sample 720 that is covered within the same pixel 710

Figure 7D:
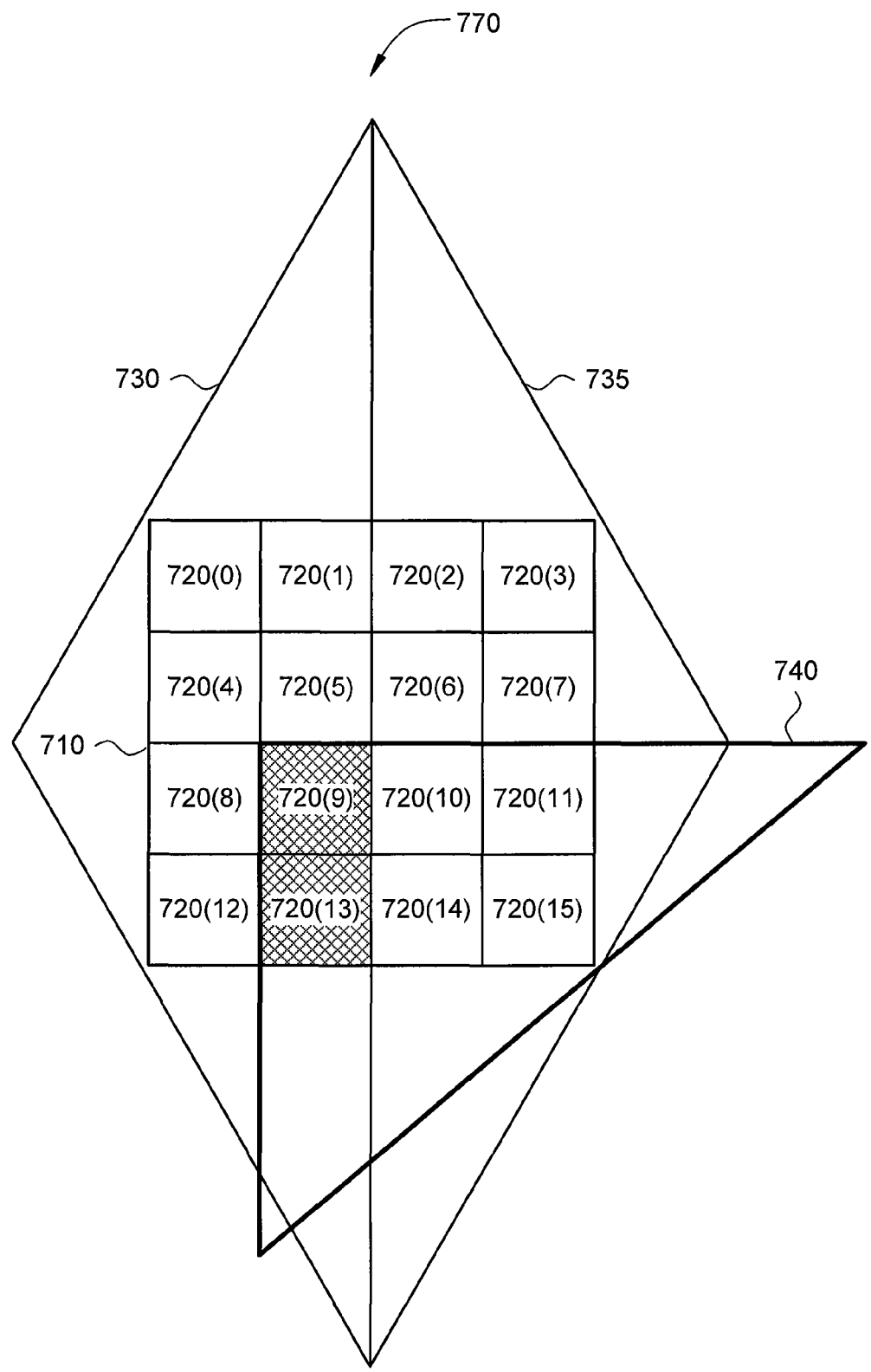

As shown in FIG. 7D, a third graphics primitive 740 intersects with the pixel 710. Graphics primitive 740 is in front of graphics primitive 730 and behind graphics primitive 735. Prior to z testing, the graphics primitive 740 covers six samples 720(9), 720(10), 720(11), 720(13), 720(14), and 720(15). The corresponding pre-z coverage bit mask may be 0xEE00, reflecting the six samples of pixel 710 that are covered by the graphics primitive 740 prior to z testing. After z testing, the graphics primitive 740 covers shaded samples 720(9) and 720(13). The corresponding post-z coverage bit mask may be 0x2200, reflecting the two samples of pixel 710 that are covered by the graphics primitive 740 after z testing. The CROP unit 550 stores this post-z coverage bit mask in a render target 610 at the location corresponding to the pixel 710 and associated with the graphics primitive 740. The post-z coverage bit mask may be stored in multiple locations in the render targets, where each location represents a sample 720 that is covered within the same pixel 710

After rendering graphics primitive 740, graphics primitive 730 covers only six samples 720(0), 720(1), 720(4), 720(5), 720(8), and 720(12). However, as described above in conjunction with FIG. 7A, graphics primitive 730 covered eight samples at the time graphics primitive 730 was originally rendered. In one embodiment, the post-z coverage masks may represent post-z coverage as of the time each graphics primitive is first rendered. In such a case, the post-z coverage bit mask for graphics primitive 730 may remain as 0x3333, reflecting the eight samples of pixel 710 covered by the graphics primitive 730 at the time of rendering. In another embodiment, the post-z coverage masks may represent post-z coverage after all graphics primitives in a scene are rendered. In such a case, the post-z coverage bit mask for graphics primitive 730 may be modified to 0x1133, reflecting the six samples of pixel 710 covered by the graphics primitive 730 after rendering graphics primitive 740.

In some embodiments, the pixel 710 includes samples that have passed a visibility test. Such a visibility test may include any one or more tests to determine whether the samples are visible in a final rendered image, including, without limitation a depth test, a stencil test, an alpha test, and a depth bounds test, in any combination. The visibility test may be performed after the samples have been processed by the fragment shader 530. In an alternative embodiment, the samples may not be processed by the fragment shader 530. In such cases, the fragment shader 530 may be powered off or in a low-power state.

Post-z coverage information may be used in various applications in addition to typical 3D rendering techniques. In one example, post-z coverage information could be used to support deferred rendering. With deferred rendering, the fragment processing unit 460 or ROP unit 465 stores fragment data directly in one or more render targets 610 without rendering the fragment data. After the render targets 610 accumulate fragment data associated with multiple graphics primitives, the fragment processing unit 460 or ROP unit 465 retrieves the fragment data from the render targets 610, performs one or more blending or compositing operations on the retrieved fragment data, and stores the resulting color values or other pixel information into the render targets. The post-z coverage data may be used to determine the set of samples that are affected by each of the stored fragments.

In another example, post-z coverage information could be used to support path rendering. Path rendering is a 2D graphics rendering technique where a scene is specified as a sequence of resolution-independent outlines, known as paths that can be filled or stroked. These paths, also known as outlines, specify an object to render as a sequence of commands for drawing connected lines, curves, and arcs. These paths may be concave, may self-intersect, may contain holes, and may be arbitrarily complex. Such paths may be painted with constant colors, linear or radial gradients, or images (filled), outlined to form a counter drawing of the path (stroked), or both. As a particular path is traversed, the post-z coverage information may be used to determine whether a sample is inside or outside of a space that is circumscribed by the path. The post-z coverage information for a set of samples may be initialized to zero. As fragments are processed, the shader program 530 may perform an XOR operation of the post-z coverage information for the current fragment with the post-z coverage information stored in the render target. The post-z coverage information may be set to one the first time the sample intersects with a fragment. The post-z coverage information may be reset to zero the second time the sample intersects with a fragment, set back to one the third time the sample intersects with a fragment, and so on. Once the traversal completes, a "one" value may indicate that a sample is interior to the space circumscribed by the path, while a "zero" value may indicate that a sample is exterior to the space circumscribed by the path.

Alternatively, the space circumscribed by the path may be filled as the path is traversed. The shader program 530 may perform an OR operation of the post-z coverage information for the current fragment with the post-z coverage information stored in the render target. Once the traversal completes, a "one" value may indicate that a sample was filled during the traversal while a "zero" may indicate that the sample was not filled during the traversal.

In yet another example, post-z coverage information could be used to support target independent rasterization. With target independent rasterization, the number of samples per pixel may be specified independently of the memory allocated for storing the rendered image. For example, the graphics processing pipeline could be configured to rasterize eight samples per pixel while the CROP unit 550 is configured to write to a single render targets could be configured to store one sample per pixel. Such a configuration may be called an 8:1 mode. In such cases, rasterization may proceed at a rate that is unrelated to the configuration of the render target. Post-z coverage may be used to determine the number of samples in a given pixel that are covered by one or more graphics primitives. If eight samples out of sixteen are covered, then the pixel has 50% coverage, if twelve samples out of sixteen are covered, then the pixel has 75% coverage, and so on. The CROP unit 550 may then compute the single color value for the pixel as weighted by the percentage of coverage.

Finally, post-z coverage information could be used to determine the pre-z or post-z coverage centroid of a fragment. Referring back to FIG. 7D, the centroid of the pixel 710 is a point that is at the center of the region covered by the pixel 710. However, this point is not the centroid of the portion of the pixel 710 covered by the graphics primitive 740. As described above, the pre-z coverage of graphics primitive 740 includes six samples 720(9), 720(10), 720(11), 720(13), 720(14), and 720(15). By examining the pre-z coverage data, the pre-z centroid of the intersection of the pixel 710 with graphics primitive 740 may be determined as the midpoint of the line segment adjoining sample 720(10) and 720(14). The post-z coverage of graphics primitive 740 includes two samples 720(9) and 720(13). By examining the post-z coverage data, the post-z centroid of the intersection of the pixel 710 with graphics primitive 740 may be determined as the midpoint of the line segment adjoining sample 720(9) and 720(13).

Figure 8:
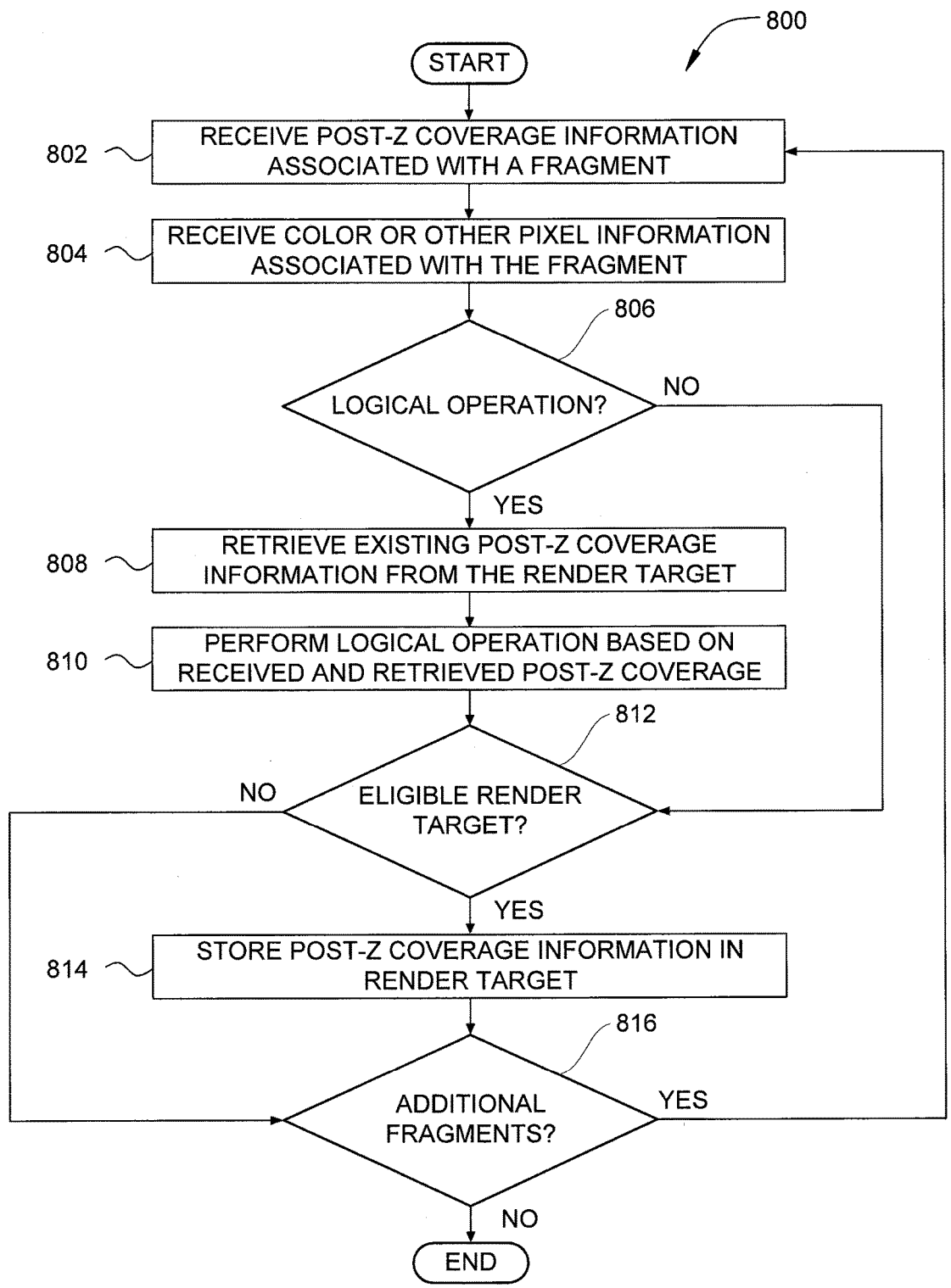
FIG. 8 sets forth a flow diagram of method steps for storing post-z coverage data, according to one embodiment of the present invention.

FIG. 8 sets forth a flow diagram of method steps for storing post-z coverage data, according to one embodiment of the present invention. Although the method steps are described in conjunction with the systems of FIGS. 1-6, persons of ordinary skill in the art will understand that any system configured to perform the method steps, in any order, is within the scope of the inventions.

As shown, a method 800 begins at step 802, where the CROP unit 550 receives post-z coverage information associated with a fragment that includes one or more samples. At step 804, the CROP unit 550 receives color or other information associated with the fragment. At step 806, the CROP unit 550 determines whether the application is configured to perform a logical operation on the post-z coverage information. For example, the CROP unit 550 could perform a logical OR or XOR operation of the currently received post-z coverage information with the previously stored post-z coverage information retrieved from a render target 610. If the application is configured to perform a logical operation, then the method 800 proceeds to step 808, where the CROP unit 550 retrieves existing post-z coverage information from a render target 610.

At step 810, the CROP unit 550 performs the logical operation based on the received post-z coverage information and the retrieved post-z coverage information. At step 812, the CROP unit 550 determines whether the store operation of the post z-coverage information is directed to an eligible render target 610. If the store operation is directed to an eligible render target, then the method 800 proceeds to step 814, where the CROP unit 550 stores the post-z coverage information in the render target 610. At step 816, the CROP unit 550 determines whether additional fragments are available to process. If additional fragments are available to process, then the method 800 returns to step 802, described above. If no additional fragments are available to process, then the method 800 terminates.

Returning to step 812, if the store operation is directed to an ineligible render target, then the method 800 proceeds to step 816, described above.

Returning to step 806, If the application is not configured to perform a logical operation, then the method 800 proceeds to step 812, described above.

In sum, a raster operations unit stores post-z coverage data to a render target. The post-z coverage data may be computed by an early z test unit, a late z test unit or a fragment shading unit. The raster operations unit stores the post-z coverage data to a single component render target. Alternatively, the raster operations unit stores the post-z coverage data to one component of a multiple component render target. The GPU then computes color and other pixel information for the samples based on the post-z coverage data. Post-z coverage data may also be used to support other rendering techniques such as deferred rendering, path rendering, and computing the post-z coverage centroid of a fragment.

One advantage of the disclosed techniques is that the GPU computes color and other pixel information only for visible fragments as determined by post-z coverage data. The GPU does not compute color and other pixel information for obscured fragments, thereby reducing overall power consumption and improving overall render performance.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A method for storing coverage information in a first render target, the method comprising:
    retrieving a first coverage mask associated with a first portion of a first graphics primitive, wherein the first graphics primitive intersects a pixel that includes a plurality of samples that have passed a visibility test, and the first portion of the first graphics primitive covers at least one sample included in the plurality of samples;
    retrieving, from the first render target, a second coverage mask associated with a second portion of the first graphics primitive;
    performing a logical operation based on the first coverage mask and the second coverage mask to generate a modified second coverage mask;
    storing, via a color raster operations unit, the modified second coverage mask in a data field in the first render target at a first location associated with the pixel; and
    rendering at least one of the first portion of the first graphics primitive and the second portion of the first graphics primitive into a second rendering target based on the modified second coverage mask.

2. The method of claim 1, wherein the visibility test comprises at least one of a depth test, a stencil test, an alpha test, and a depth bounds test.

3. The method of claim 1, wherein the visibility test is performed after the plurality of samples have been processed by a fragment shader.

4. The method of claim 1, wherein the plurality of samples is not processed by a fragment shader.

5. The method of claim 4, wherein the fragment shader is in a low power state.

6. The method of claim 1, further comprising storing the first coverage mask in a data field in the first render target at a second location associated with the pixel, wherein the first location corresponds to a first sample and the second location corresponds to a second sample.

7. The method of claim 1, further comprising detecting that the first render target is eligible for storing coverage information.

8. The method of claim 1, wherein the data field is selected from a plurality of data fields associated with the first render target.

9. The method of claim 1, wherein the first coverage mask comprises a plurality of bits, and wherein each bit corresponds to a different sample in the plurality of samples.

10. The method of claim 1, wherein the first coverage mask indicates which samples are covered by the first portion of the first graphics primitive.

11. The method of claim 10, further comprising computing a percentage of the pixel covered by the first portion of the first graphics primitive based the first coverage mask.

12. The method of claim 1, further comprising:
receiving a third coverage mask associated with a second portion of a second graphics primitive, wherein the second primitive intersects the pixel, and the second portion of the second graphics primitive covers at least one sample included in the plurality of samples; and
storing the third coverage mask in a data field in the first render target at a second location associated with the pixel;
wherein the third coverage mask indicates which samples are covered by the second portion of the second graphics primitive and are not obscured by the first portion of the first graphics primitive.

13. The method of claim 12, further comprising computing a centroid of the second portion of the second graphics primitive based on the third coverage mask.

14. The method of claim 12, further comprising:
storing a first attribute associated with the first portion of the first graphics primitive in a data field in the first render target at a third location associated with the pixel;
storing a second attribute associated with the second portion of the second graphics primitive in a data field in the first render target at a fourth location associated with the pixel;
performing a blend operation on the first attribute and the second attribute based on at least one of the first coverage mask and the third coverage mask; and
storing a result of the blend operation in a data field in the first render target at a fifth location associated with the pixel.

15. The method of claim 1, wherein the first render target is included in a plurality of render targets that further includes a second render target that stores color information, a third render target that stores depth information, and a fourth render target that stores normal vector information.

16. The method of claim 1, further comprising:
retrieving a third coverage mask associated with a first portion of a second graphics primitive, wherein the first graphics primitive intersects a pixel that includes a plurality of samples that have passed a visibility test, and the first portion of the second graphics primitive covers at least one sample included in the plurality of samples;

determining that the third coverage mask is directed to a second render target that is ineligible to store coverage mask information; and
discarding the third coverage mask.

17. The method of claim 1, further comprising transmitting, via a multiplexer, the first coverage mask to the color raster operations unit based on a first state of a control signal received from a streaming multiprocessor (SM).

18. The method of claim 1, further comprising, subsequent to storing the modified second coverage mask, transmitting, via the multiplexer, color information to the color raster operations unit based on a second state of the control signal received from the SM.

19. The method of claim 1, further comprising:
transmitting, via a multiplexer, the first coverage mask to the color raster operations unit based on a first state of a control signal received from a streaming multiprocessor (SM); and
subsequent to storing the modified second coverage mask, transmitting, via the multiplexer, color information to the color raster operations unit based on a second state of the control signal received from the SM.

20. The method of claim 19, wherein the first coverage mask is received from a late z-raster operations unit, and the color information is received from a fragment shader.

21. A subsystem comprising:
a raster operations unit that stores coverage information in a first render target by performing the steps of:
retrieving a first coverage mask associated with a first portion of a first graphics primitive, wherein the first graphics primitive intersects a pixel that includes a plurality of samples, and the first portion of the first graphics primitive covers at least one sample included in the plurality of samples;
retrieving, from the first render target, a second coverage mask associated with a second portion of the first graphics primitive;
performing a logical operation based on the first coverage mask and the second coverage mask to generate a modified second coverage mask; and
storing, via a color raster operations unit, the modified second coverage mask in a data field in the first render target at a first location associated with the pixel; and
rendering at least one of the first portion of the first graphics primitive and the second portion of the first graphics primitive into a second rendering target based on the modified second coverage mask.

22. The subsystem of claim 21, wherein the raster operations unit further performs the step of detecting that the first render target is eligible for storing coverage information.

23. The subsystem of claim 21, wherein the data field is selected from a plurality of data fields associated with the first render target.

24. The subsystem of claim 21, wherein the first coverage mask comprises a plurality of bits, and wherein each bit corresponds to a different sample in the plurality of samples.

25. The subsystem of claim 21, wherein the first coverage mask indicates which samples are covered by the first portion of the first graphics primitive.

26. The subsystem of claim 21, wherein the raster operations unit further performs the step of computing a percentage of the pixel covered by the first portion of the first graphics primitive based the first coverage mask.

27. The subsystem of claim 21, wherein the raster operations unit further performs the steps of:

receiving a third coverage mask associated with a second portion of a second graphics primitive, wherein the second primitive intersects the pixel, and the second portion of the second graphics primitive covers at least one sample included in the plurality of samples; and storing the third coverage mask in a data field in the first render target at a second location associated with the pixel;

wherein the third coverage mask indicates which samples are covered by the second portion of the second graphics primitive and are not obscured by the first portion of the first graphics primitive.

28. The subsystem of claim 27, wherein the raster operations unit further performs the step of computing a centroid of the second portion of the second graphics primitive based on the third coverage mask.

29. The subsystem of claim 27, wherein the raster operations unit further performs the steps of:

storing a first attribute associated with the first portion of the first graphics primitive in a data field in the first render target at a third location associated with the pixel;

storing a second attribute associated with the second portion of the second graphics primitive in a data field in the first render target at a fourth location associated with the pixel;

performing a blend operation on the first attribute and the second attribute based on at least one of the first coverage mask and the third coverage mask; and storing a result of the blend operation in a data field in the first render target at a fifth location associated with the pixel.

30. A computer system comprising:

a memory;

a raster operations unit coupled to the memory, wherein the raster operation unit stores coverage information in a first render target by performing the steps of:

retrieving a first coverage mask associated with a first portion of a first graphics primitive, wherein the first graphics primitive intersects a pixel that includes a plurality of samples, and the first portion of the first graphics primitive covers at least one sample included in the plurality of samples;

retrieving, from the first render target, a second coverage mask associated with a second portion of the first graphics primitive;

performing a logical operation based on the first coverage mask and the second coverage mask to generate a modified second coverage mask; and storing, via a color raster operations unit, the modified second coverage mask in a data field in the first render target at a first location associated with the pixel; and rendering at least one of the first portion of the first graphics primitive and the second portion of the first graphics primitive into a second rendering target based on the modified second coverage mask.

* * * * *